United States Patent

Dorsch et al.

[15] 3,683,340

[45] Aug. 8, 1972

[54] MAGNETIC INFORMATION STORAGE DEVICE

[72] Inventors: Gerhard Dorsch, Weissenbrunn Nr. 79, Post Altdorf; Wolfgang Wagnerberger, Herbartstr. 10, Nurnberg, both of Germany

[22] Filed: Sept. 2, 1970

[21] Appl. No.: 69,040

[30] Foreign Application Priority Data

Sept. 16, 1969 Germany..........P 19 46 760.8

[52] U.S. Cl..340/174 SP, 340/174 PM, 340/174 HA

[51] Int. Cl. ............................................G11c 17/00

[58] Field of Search....340/174 SP, 174 PM, 174 HA

[56] References Cited

UNITED STATES PATENTS

| | | |
|---|---|---|
| 3,490,011 | 1/1970 | Ransom................340/174 SP |
| 3,134,096 | 5/1964 | Bartkus et al.......340/174 PM |
| 3,175,199 | 3/1965 | Kilburn...............340/174 PM |

FOREIGN PATENTS OR APPLICATIONS

| | | |
|---|---|---|
| 965,596 | 8/1964 | Great Britain......340/174 PM |
| 999,496 | 7/1965 | Great Britain........340/174 SP |

*Primary Examiner*—Stanley M. Urynowicz, Jr.

*Attorney*—Curt M. Avery, Arthur E. Wilfond, Herbert L. Lerner and Daniel J. Tick

[57] ABSTRACT

A magnetic information storage device has at least two unitary members of magnetizable, punchable magnetic material. The members have respective polarities of opposite sign and are joined so as to form a composite member having juxtaposed regions of respective, opposite polarities. A structure made of nonmagnetizable, punchable material is provided for carrying the composite member. The composite member has a scan pattern defined by a plurality of regions across the surface thereof. A selected number of these regions has punched-through openings, whereby the disposition of the regions with the openings relative to the other regions determine the information stored in the device.

3 Claims, 4 Drawing Figures

MAGNETIC INFORMATION STORAGE DEVICE

Our invention relates to magnetic information storage devices, in particular, such storage devices which are assembled from parts made of magnetizable material.

Previously, it had been the practice to electromagnetically record information on a magnetizable information carrier. These information storage devices have the disadvantage that they are, for control purposes, not visually readable without additional assistance means.

It is an object of our invention to provide a magnetic information storage device that provides a nonconfusable characterization of articles produced in quantity. It is another object of our invention to provide a magnetic information storage device which is visually readable for control purposes without requiring additional assisting means. It is still another object of our invention to provide a magnetic information storage device that renders the electromagnetic recordation of information unnecessary.

According to a feature of the invention, at least two unitary magnetizable parts of opposite polarity and made of magnetic material are joined together so that the unlike polarities are disposed next to each other and so that the parts are mounted on a common carrier of non-magnetic material. The parts have regions whereat the material is punched out and whereat the material is not punched out, these respective regions being selected to correspond to the stored information.

According to another feature of the invention, the information is read without a touch contact by means of magnetic scanning members, preferably, Hall generators.

The invention will now be described with reference to the accompanying drawing wherein.

Figure 1:
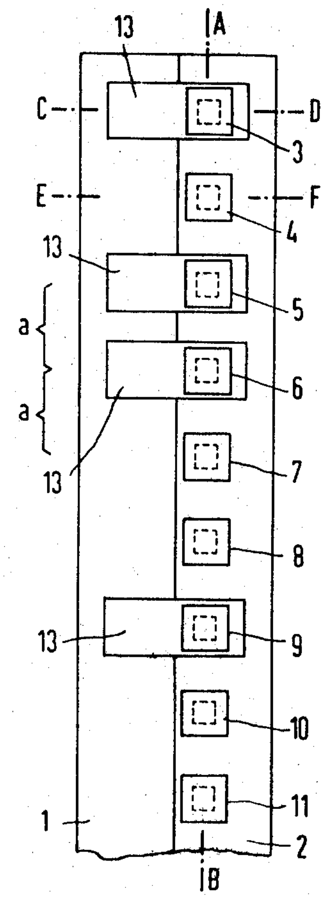
FIG. 1 is a plan view of a magnetic information storage device according to the invention.
Figure 2:
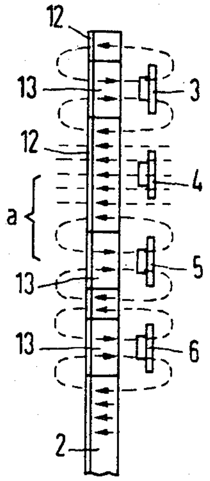
FIG. 2 is a longitudinal section of the device of FIG. 1 taken on line A—A.
Figure 3:
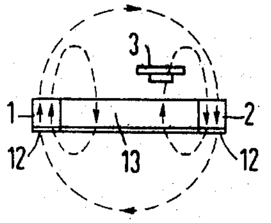
FIG. 3 is a cross section of the device of FIG. 1 taken on line C–D.
Figure 4:
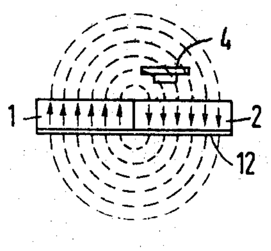
FIG. 4 is a cross section of the device of FIG. 1 taken on line E–F.

Referring to FIG. 1, the information storage device comprises two unitary strips 1 and 2 joined together. Strips 1 and 2 are magnetized so as to have opposite polarities and are made of permanent magnetic punchable material such as a magnetic rubber foil of barium ferrite with flexible binding means. The individual strips are for example 0.3 mm thick and 3.25 mm wide. Each bit to be stored requires approximately a length of 3 mm. The two strips 1 and 2 are joined to each other and mounted on a common carrier that is likewise punchable, the latter being made of nonmagnetizable material.

The actual information in the storage exists because of regions therein that are either punched out or not within a definite raster division (a), for example, having a length of 3 mm. These regions are, for example, about 4.5 mm wide and 2 mm high. The transmission of information is achieved without a touch contact by means of magnetic scanning members 3 to 11 that are preferably Hall generators. These Hall generators are likewise arranged in raster divisions (a) along the scanning line A–B at a distance (d) from 0.1 to 0.5 mm above the information storage means comprising parts 1 and 2.

Referring to FIGS. 1, 2, 3 and 4 the scanning members 3, 5, 6 and 9 positioned over the punched out regions 13 are penetrated by a magnetic flux in a direction opposite to the direction with which a magnetic flux passes through scanning members 4,7,8,10,11 positioned over solid portions. Accordingly, a corresponding positive or negative output signal appears at the outputs of the scanning members. The change of direction of the magnetic flux in the region of a punched out portion guarantees a minimal disturbance during scanning.

Additional information storage devices can be placed in rows next to each other thereby increasing the information content as desired, for example, for use with magnetic punched cards.

To those skilled in the art it will be obvious upon a study of this disclosure that our invention permits of a great variety of modifications. For example, the parallel arrangement of the information storage devices according to the invention may be carried over to other geometrical configuration such as concentric rings. Thus the invention may be given embodiments other than those illustrated and described herein, without departing from the essential features of our invention and within the scope of the claims annexed hereto.

We claim:

1. Magnetic information storage device comprising at least two unitary members of magnetizable, punchable magnetic material, said members having respective polarities of opposite sign and being joined so as to form a composite member having juxtaposed regions of respective opposite polarities, and a structure made of nonmagnetizable, punchable material for carrying said composite member, said composite member having a scan pattern defined by a plurality of regions across the surface thereof, a selected number of said regions having punched-through openings causing respective magnetic fields through said selected regions different from the magnetic fields at the other of said regions, whereby the disposition of said regions with said openings relative to the other of said regions determines the information stored in said device.

2. In a device according to claim 1, said members begin in the form of strips.

3. In a device according to claim 1, said members consisting of a barium ferrite magnetic rubber foil.

* * * * *